Nov. 29, 1960
R. E. WITT
2,962,542
MULTICONDUCTOR CABLE JUNCTION DEVICE
Filed April 8, 1958
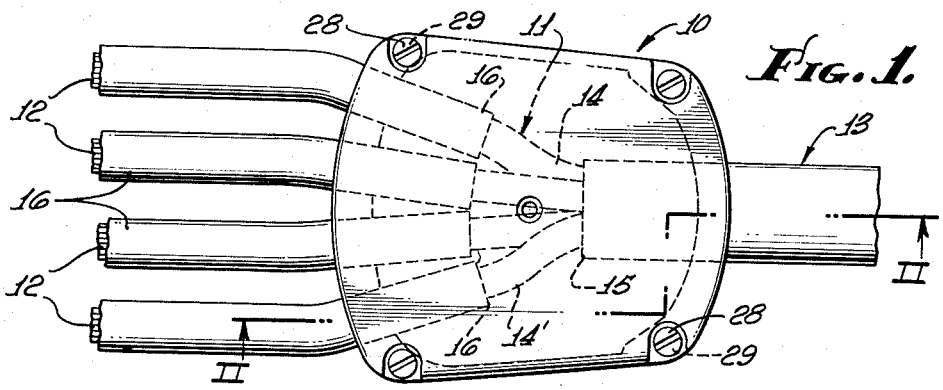
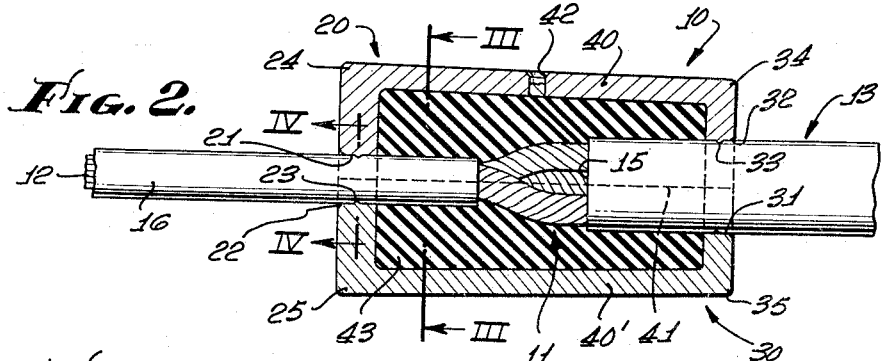
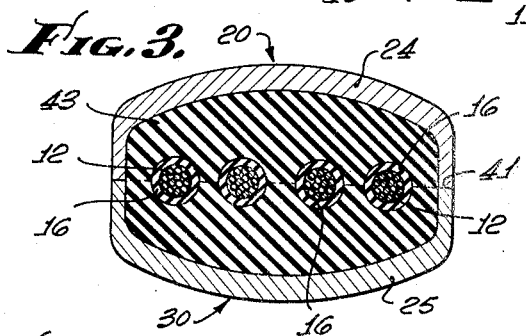
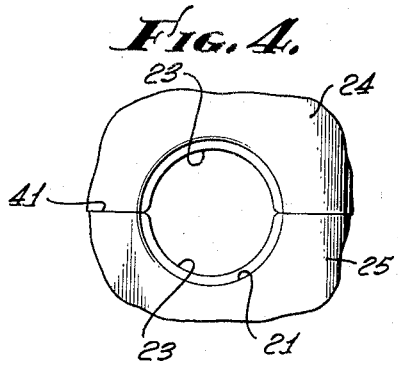
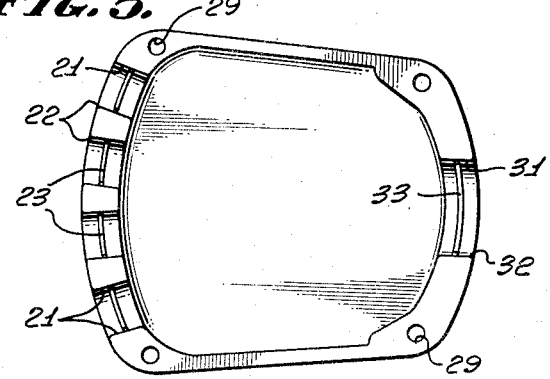
RUSSELL E. WITT,
INVENTOR.
BY
ATTORNEYS.

United States Patent Office 2,962,542
Patented Nov. 29, 1960

2,962,542

MULTICONDUCTOR CABLE JUNCTION DEVICE

Russell E. Witt, North Hollywood, Calif., assignor to Pacific Automation Products, Inc., Glendale, Calif., a corporation of California Filed Apr. 8, 1958, Ser. No. 727,105

2 Claims. (Cl. 174—76)

The present invention relates to a multiconductor cable junction device for positioning and holding a plurality of flexible branch cables in spaced relation with respect to each other and a multiconductor feeder cable at a juncture.

With the tremendous increase in activity in research and development, there are many projects which cannot be carried on with standard equipment. These projects must be provided with specially designed equipment which generally cannot be transferred and used on other projects. One of the more important items under this special equipment is electrical conductive cables which connect various instruments, sensing devices, actuating devices, computers, indicators, and the like. Generally, these instruments or like devices are controlled from a remote control central panel. It is therefore desirable to provide a single flexible multiconductor feeder cable from the control panel to the area of the instruments and have a junction on the cable trunk for radiating flexible branch cables to the intended instruments. This junction on the multiconductor cable is commonly known as a "break-out" point to those skilled in the art. Due to the complexity of the particular cable design, there may be any number of branch cables radiating from the juncture or break-out point on the feeder or trunk of the multiconductor cable. In some instances, it is desirable that a branch cable also split into a number of individual conductor cables. As can be readily understood, these junctions are subjected to many stresses and strains from the bending of the individual flexible branch cables which radiate outwardly in various directions, and often result in impaired connections, breakage, etc.

In many instances heretofore, a multiconductor cable (composed of say six strands, each of which may be composed of a plurality of conducting wires) was cut, the separate strands splayed out, and each strand then connected to the end of a branch cable by twisting bare ends of conducting wire together, clamping them and covering with tape. The six joints thus made were then embedded in a dielectric composition (which was generally of thermosetting properties) for the purpose of insulating these joints from each other and protecting them from moisture, weather, etc. The dielectric composition or elastomer such as neoprene is often cast at such junction, and a separate mold must be made for each job or junction. Difficulty was often encountered in insuring permanent contact and bond between the elastomer and the insulating coverings on the feeder and branch cables, and separation would occur when branch cables were bent or pulled, thereby permitting moisture to enter the junction. Furthermore, elastomers having high dielectric coefficients in most instances set to bodies which have low mechanical strength so that the junction was mechanically weak; elastomers of better mechanical properties (such as strength and resistance to wear) generally have low dielectric coefficients. As a result of the various factors, prior junctions were difficult and expensive to make, were bulky and heavy, did not maintain the break lines in fixed spaced relation at the junction and had a short effective life.

The present invention is directed to a construction applicable to any junction at which a feeder cable is connected to a plurality of flexible branch cables, and is particularly directed to a construction which is economical, permits the use of curable dielectric compositions of high insulating properties without sacrificing strength, effectively protects the junction from moisture, heat, weathering and mechanical forces, maintains the branch cables in properly spaced relation at the junction and prevents tearing or damage due to bending of tension applied to the branch cables.

Generally stated, the present invention provides a pair of clamps, one adapted to grasp and hold a feeder cable and another to grasp and hold a plurality of branch cables in spaced relation and desired order, the two clamps being interconnected and held in predetermined spaced relation by a frame or housing which encloses or protects a body of dielectric material in which the end portions of the feeder and branch conduits are embedded. In a more specific embodiment, each of the branch cables is an integral extension of a strand of a multiconductor feeder cable, the feeder cable having an insulating and protective covering which terminates at the dispersal zone or junction and each of the branch cables (or unbroken tensions of a strand or group of the feeder cable) having its own insulating and protective covering terminating in such zone or junction.

The object of the present invention is the provision of a novel, multiconductor cable junction device.

Another object is to provide a device for positioning and holding a plurality of flexible branch cables in spaced relation with respect to each other and a feeder multiconductor cable at a junction.

A further object of this invention is the provision of a multiconductor cable junction device enclosing a multiconductor cable junction and preventing relative movement between the radiating branch cables and the feeder cable.

Still another object is to provide a multiconductor cable junction device which can be securely clamped about a multiconductor feeder junction and is also detachable.

A final object of the present invention is the provision of a multiconductor cable junction device which is inexpensive to produce and very easy to assemble.

Other objects and many of the attendant advantages of this invention will be readily appreciated as the same becomes understood by reference to the following detailed description when considered in connection with the accompanying drawings, wherein:

Fig. 1 shows a top plan view of the device of the present invention connected to a multiconductor cable junction.

Fig. 2 illustrates a longitudinal section of the device taken along plane II—II of Fig. 1.

Fig. 3 shows a transverse section of the device taken along plane III—III of Fig. 2.

Fig. 4 illustrates a transverse section of the device along plane IV—IV of Fig. 2.

Fig. 5 illustrates a bottom view of one half of the clamping device of the present invention and for clarity is not connected to the multiconductor cable.

Referring now to the drawings, wherein like reference characters designate like or corresponding parts throughout the several views, there is shown in Fig. 1 a multiconductor cable junction device 10 enclosing a multiconductor cable junction 11 having a plurality of branch cables 12 and at least one feeder cable 13. The multiconductor feeder cable 13 contains a plurality of conductors or strands 14, 14' and the like, and is covered and protected by a suitable flexible insulating material 15, such as neoprene. It is to be understood that the feeder cable 13 may contain any desired number of strands or conductors 14, each such strand or conductor may comprise or contain one or more conductor wires, and such conductors 14 may differ from each other in the number of character of wires constituting such conductors depending upon the current, frequency, power, intelligence being conveyed and results or effect desired. Although the branch cables 12 may be joined to strands 14 of the feeder 13 by soldering and the like, such soldered or clamped joints are bulky and often introduce added resistance, impedance and other undesirable characteristics into a circuit including such joint.

In the preferred form of device illustrated, each of the branch cables 12 is an integral continuation of one of the strands or conductors 14 of feeder cable 13, so that no joints exist in the junction box. At the junction 11, insulation 15 is stopped or cut away from the feeder cable, the various conductors or strands 14, 14', etc., are separated and splayed out and a covering of suitable insulating material 16 is applied to such separated strands, forming a plurality of branch cables 12. These branch cables may then lead to various devices, instruments, circuits, etc.

The device 10 may be provided with a first clamp 20 and a second clamp 30 (see Fig. 2) which are spaced from and may be connected to each other by any suitable means, such as integral connecting housing means 40 and 40'. The first clamp 20 may be provided with a plurality of spaced openings 21 of a diameter adapted to receive the flexible branch cables 12. The second clamp 30 may be provided with at least one opening 31 adapted to receive the feeder 13. The openings 21 and 31 in the first and second clamps 20 and 30 may be provided with an enlarged and flaring outer entry portion 22 and 32, respectively, whereby the flexible branch cables and the feeder cable may be bent without imposition of undue stress on the cables. In addition, any one or all of the openings 21 and 31 may be provided with an inwardly extending circumferential bead, knurl, or roughened surface 23 and 33 to extend into and be sealed with the surface of the flexible cable in such opening.

Each of the clamps 20 and 30 may be split along a mating plane 41 diametrical with respect to the openings 21 and 31 to form a pair of mating, clamping portions 24 and 25, and 34 and 35, respectively (see Fig. 2). As a preferred construction, the clamping portions 24 and 34 are rigidly connected by the connecting housing means 40 forming an integral upper unit; and the clamping portions 25 and 35 are also rigidly connected by the connecting housing means 40', thus forming an integral lower unit. However, the present invention contemplates the use of separate clamps which are not integral with each other, but are connected by means of straps or brackets which can be adjustable to allow the clamps to be positioned about various size junctions. For example, clamping portions 24 and 25 may be connected to clamping portions 34 and 35, respectively, by any suitable arrangement of straps or connecting members which form a cage.

After the clamps 20 and 30 have been positioned about the multiconductor cable junction 11 as shown in Figs. 1 to 3, means are provided for connecting the mating, clamping portions 24 and 25 of clamp 20, and the mating clamping portions 34 and 35 of the clamp 30. This connecting means may be elongated bolts 28 passing through suitable openings in one of the clamping portions of each of the clamps 20 and 30 and engaging threaded openings 29 in the other clamping portions of each of the clamps 20 and 30.

The housing means 40 and 40' form a protective enclosure and may be provided with a filling inlet 42 to allow the junction 11 to be encased with a protective material. As indicated, in Figs. 2 and 3, a protective material 43 may be provided around the junction 11 and within the clamps 20 and 30 to protect the junction from moisture or any possible damage from the weather. Although any suitable protective material or elastomer may be used having high insulating properties which effectively protects the junction from moisture, heat, and weathering forces, neoprene is considered to be a suitable readily curable material for these functions and can readily be inserted into the housing through the filler inlet 42. However, it should be noted that while the protective material 43 is desirable and certain advantages obtained by its use, it can be omitted if there is no danger of the cable junction 11 being damaged because of moisture or the weather and the function of the clamps 20 and 30 will not be impaired.

In assembling the cable junction device 10, the lower unit having clamping portions 25 and 35 may first be placed around the junction 11 and the upper unit having clamping portions 24 and 34 may then be placed on the other side of the junction 11 and into mating engagement with the lower unit. The elongated bolts 28 or other suitable connecting means are then applied to each of the clamps 20 and 30 to hold the clamps together in firm engagement with the feeder cable 13 and the branch cables 12. As the clamps 20 and 30 are drawn together, the beads 23 and 33 extend into the surface of the flexible cable passing through each such opening and aid in preventing relative movement of the cables in each of the openings. After the clamps are connected together, the protective material 43 may then be inserted through the inlet 42 to cover the cable junction 11.

It can therefore be seen that a cable junction device is provided which permits the use of curable dielectric composition of high insulating properties without sacrificing strength, effectively protects the junction from moisture, heat, weathering and mechanical forces, maintains the branch cables in properly spaced relation at the junction and prevents tearing or damage due to bending and tension applied to the branch cables.

In addition, it should be noted that the clamping device 10 of the present invention can be provided with any number of openings 21 which vary in size for receiving branch cables having various diameter conductors. With such a device, the cost of providing a plurality of expensive molds as heretofore used is eliminated as the device 10 may be used to accommodate the same number of or fewer numbers of branch cables than the number of openings 21 provided therein. The clamps of the device 10 are inexpensive to produce and may be sand cast or die cast or molded and made of various materials such as rubber or synthetic rubber materials, aluminum, laminated or impregnated glass fabrics, plastics, or the like. Also, with such a device, the clamps 20 and 30 can be detached from the cable junction 11 and reused on other specially designed multiconductor cables.

Obviously, many modifications and variations of the present invention are possible in the light of the above teachings. It is therefore to be understood that within the scope of the appended claims, the invention may be practiced otherwise than as specifically described.

I claim:

1. In combination with an unspliced cable junction comprising a multiconductor feeder cable having a plurality of strands and a substantially resilient insulating and protecting coating, said protective coating terminating adjacent a zone of separation to expose said strands, each of said exposed strands being laterally separated from the others at said zone of separation and constituting an unbroken, integral continuation of a strand within the feeder cable; a separate protective, substantially flexible and resilient coating on each of said laterally separated strands, such coating starting adjacent said zone of separation and providing exposed, unspliced strands at the cable junction, said feeder cable having a diameter greater than each of said laterally separated strands; a device for positioning and holding a plurality of said flexible strands in spaced relation with respect to each other and said feeder cable at the unspliced cable junction, comprising: a clamp provided with a plurality of spaced openings, each opening receiving and clamping one of said flexible coated strands leading from said zone of separation, said clamp being split along a mating plane diametrical with respect to said openings to form a pair of mating clamping portions; a second clamp provided with an opening receiving and clamping said feeder cable, said second clamp being split along a mating plane diametrical with respect to said opening to form a second pair of mating clamping portions, each of the openings in said clamps having an inwardly extending circumferential bead extending into and sealing with the surface of said flexible strands and feeder cable, and an enlarged and flaring outer entry portion allowing the strands and feeder cable to be bent without imposition of undue stresses; said first and second clamps only engaging said resilient coatings and therefore non-electrically cooperate with said exposed strands; means for connecting the first pair of mating clamping portions together to hold the same in firm engagement with said flexible strands extending through said openings; means for connecting said second pair of mating clamping portions together to hold the same in firm engagement with said feeder cable extending through said opening; and means connecting said first and second clamps in spaced relation to each other, said means forming a protective enclosure for the unspliced cable junction between said feeder cable and said laterally spaced strands.

2. In the combination as stated in claim 1 wherein said latter means is provided with a filling inlet, and including an elastomer within said protective enclosure and clamps, embodying and protecting the exposed, unspliced zone of separation.

References Cited in the file of this patent

UNITED STATES PATENTS

| | | |
|---|---|---|
| 2,232,872 | Seitz | Feb. 24, 1941 |
| 2,587,676 | Akers | Mar. 4, 1952 |

FOREIGN PATENTS

| | | |
|---|---|---|
| 902,149 | Germany | Jan. 18, 1954 |
| 1,069,861 | France | Feb. 17, 1954 |
| 1,124,702 | France | July 2, 1956 |